United States Patent
Park et al.

(10) Patent No.: US 7,643,793 B2
(45) Date of Patent: Jan. 5, 2010

(54) METHOD FOR RELAYING DATA PACKET FOR DOWNLINK IN WIRELESS COMMUNICATION SYSTEM

(75) Inventors: Dae-Young Park, Seoul (KR);
Seung-Young Park, Yongin-si (KR);
Sang-Boh Yun, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 706 days.

(21) Appl. No.: 11/487,186

(22) Filed: Jul. 14, 2006

(65) Prior Publication Data

US 2007/0015461 A1    Jan. 18, 2007

(30) Foreign Application Priority Data

Jul. 14, 2005    (KR) .................... 10-2005-0063749

(51) Int. Cl.
*H04B 7/14*    (2006.01)
(52) U.S. Cl. ...................... 455/16; 455/7; 455/11.1; 455/15; 455/24; 370/317; 370/318; 370/335; 370/323; 370/211
(58) Field of Classification Search ............ 455/7, 455/9–11.1, 13.1, 16; 370/211–215, 335, 370/342, 317–318, 323
See application file for complete search history.

(56) References Cited

U.S. PATENT DOCUMENTS

| | | | |
|---|---|---|---|
| 6,690,657 B1 | 2/2004 | Lau et al. | |
| 7,184,703 B1 * | 2/2007 | Naden et al. | 455/10 |
| 7,218,891 B2 * | 5/2007 | Periyalwar et al. | 455/13.1 |
| 2004/0192204 A1 * | 9/2004 | Periyalwar et al. | 455/25 |
| 2004/0229563 A1 * | 11/2004 | Fitton et al. | 455/7 |
| 2007/0224931 A1 * | 9/2007 | Fitton et al. | 455/7 |

* cited by examiner

*Primary Examiner*—Edward Urban
*Assistant Examiner*—Fayyaz Alam
(74) *Attorney, Agent, or Firm*—The Farrell Law Firm, LLP (57) ABSTRACT

A method for relaying data packets to a subscriber station (SS) by taking a relay station (RS) into consideration when a base station (BS) establishes a data packet scheduling is disclosed. According to the method, a data packet is relayed by RSs, which have a signal intensity greater than a threshold value for all RSs appointed by the BS. Each SS determines whether the SS receives the data packet directly from the BS or via an RS, based on signal intensities between the SS and the BS and between the SS and RSs, and feeds channel information corresponding to the determination back to the BS, thereby allowing the data packet to be transmitted.

11 Claims, 6 Drawing Sheets

METHOD FOR RELAYING DATA PACKET FOR DOWNLINK IN WIRELESS COMMUNICATION SYSTEM

PRIORITY

This application claims the benefit under 35 U.S.C. 119(a) of an application entitled "Method For Relaying Data Packet For Downlink In Wireless Communication System" filed in the Korean Intellectual Property Office on Jul. 14, 2005 and assigned Serial No. 2005-63749, the contents of which are incorporated herein by reference.

BACKGROUND OF THE INVENTION

1. Field of the Invention

The present invention relates to a method for relaying data packets in a downlink of a wireless communication system, and more particularly to a method for relaying data packets to a subscriber station (SS) by taking a relay station (RS) into consideration when a base station (BS) establishes a data packet scheduling.

2. Description of the Related Art

In a conventional wireless communication system, a BS transmits data packets to an SS either directly or via an RS. The BS selects one of the two transmission schemes depending on the transmission efficiency thereof.

The SS feeds a current channel status back to the BS, and the BS performs a scheduling operation with respect to the SS to receive a service in the next frame, by using information about the current channel status.

However, there is not yet a detailed algorithm for either a scheme for selecting an optimum RS for each SS or for simultaneously transmitting data packets via a plurality of RSs to an SS, when the BS establishes a data packet scheduling for downlink by taking the RSs into consideration.

SUMMARY OF THE INVENTION

Accordingly, the present invention has been made to solve the aforementioned problems occurring in the prior art, and the present invention is to provide a method for selecting an optimum RS to be used for relay transmission and relaying data packets via the selected RS in a wireless communication system.

In addition, the present invention is to provide a method for relaying data, in which as SS determines whether a relay transmission using an RS is used, depending on signal intensities between the SS and a BS and between the SS and the RS in a wireless communication system.

To this end, the present invention provides a method for relaying a data packet in a downlink of a wireless communication system, in which a BS transmits the data packet to SSs by using RSs, the method including broadcasting, by the BS, a BS pilot symbol, which includes information about an RS to be used for relay transmission in a next frame, receiving, by each RS appointed to be used for relay transmission in the next frame, the BS pilot symbol, measuring a first signal-to-noise ratio (SNR) information which is SNR information between the RS and the BS, transmitting a relay pilot symbol to the SSs when the first SNR information is equal to or greater than a threshold value, and notifying the BS that the RS has transmitted the relay pilot symbol to the SSs, receiving, by each SS, the BS pilot symbol, measuring a second SNR information which is SNR information between the SS and the BS, receiving the relay pilot symbol, measuring a third SNR information which is SNR information between the SS and each RS having transmitted the relay pilot symbol, and determining whether the data packet is received via the RS, based on the second and third SNR information, feeding the third SNR information from each SS back to the BS, when the SS determines that the data packet is received via the RS, performing, by the BS, a data packet scheduling based on the third SNR information fed back from the SSs, and transmitting the data packet to RSs which have transmitted the relay pilot symbol, and relaying, by the RSs having transmitted the relay pilot symbol, the data packet transmitted from the BS to the SSs.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted for the sake of clarity and conciseness.

Figure 1:
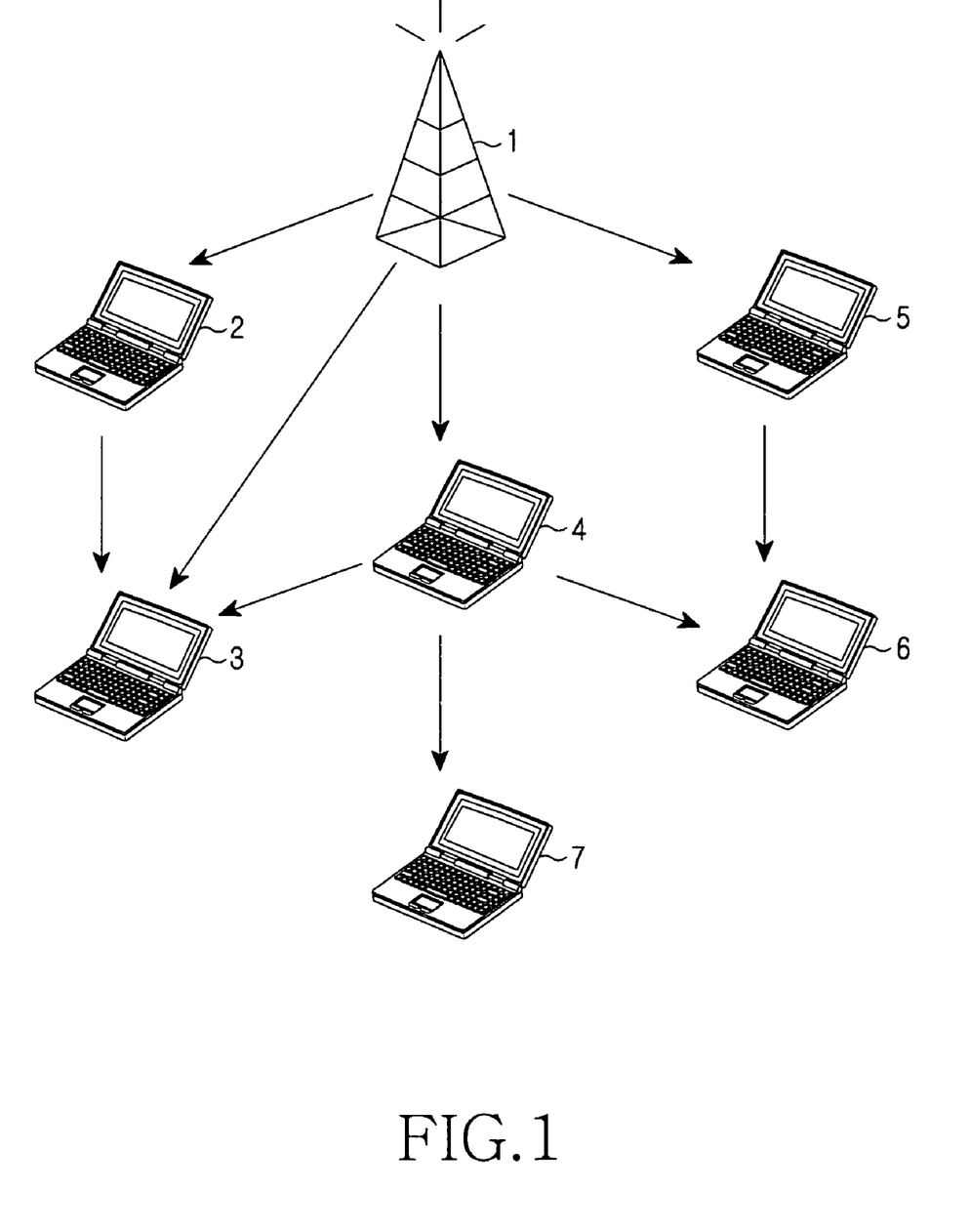
FIG. 1 is a view illustrating the construction of a wireless communication system according to the present invention.

A wireless communication system according to the present invention includes a BS 1 and a plurality of SSs 2 to 7 for downlink. Since the SSs 2 to 7 may serve as RSs, FIG. 1 shows components without distinguishing between the SSs and RSs. The BS 1 can transmit data packets through various routes by using the SSs 2, 4, and 5, which serve as RSs, as shown in FIG. 1.

Figure 2:
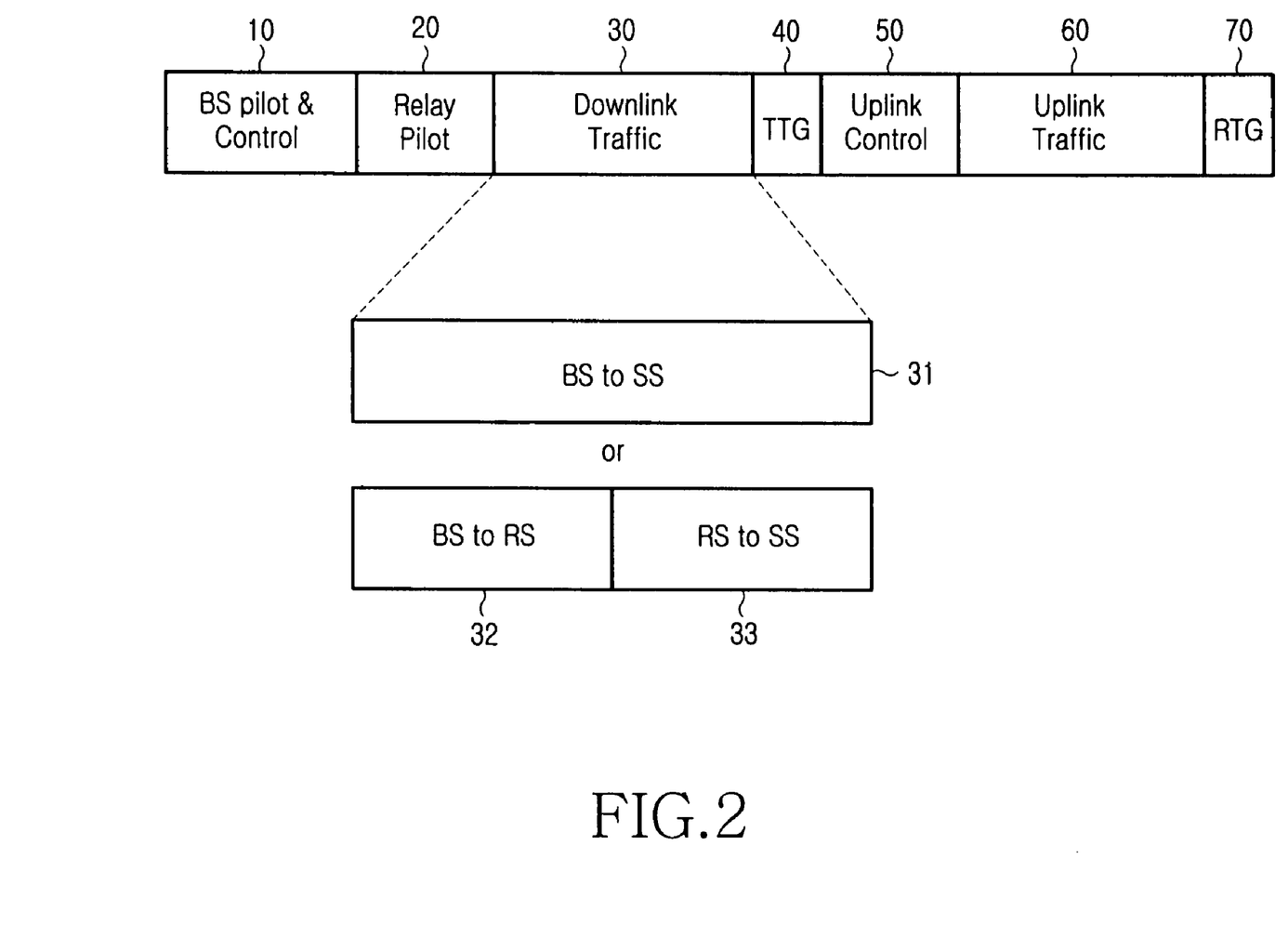
FIG. 2 is a view showing an example of a data packet, according to the present invention.

Also, the data packets transmitted according to the present invention have a Time Division Duplexing (TDD) frame structure as shown in FIG. 2. The TDD frame includes a packet 10 having a BS pilot symbol and control information, a relay pilot packet 20, a downlink traffic packet 30, a transmit transition gap (TTG) 40, an uplink control packet 50, an uplink traffic packet 60 and a receive transition gap (RTG) 70.

The packet 10, which has a BS pilot symbol and control information, includes a BS pilot symbol and all control information required for data packet transmission of the BS. The relay pilot packet 20 includes relay pilot symbol information transmitted from an RS to an SS. All the downlink traffic packet 30 may be used for data packet 31 transmitted from a BS to an SS. Alternatively, one portion of the downlink traffic packet 30 may be used for data packet 32 transmitted from a BS to an RS, and the other portion of the downlink traffic packet 30 may be used for data packet 33 transmitted from the RS to an SS. Other components will be described later in detail herein, when necessary.

Figure 3:
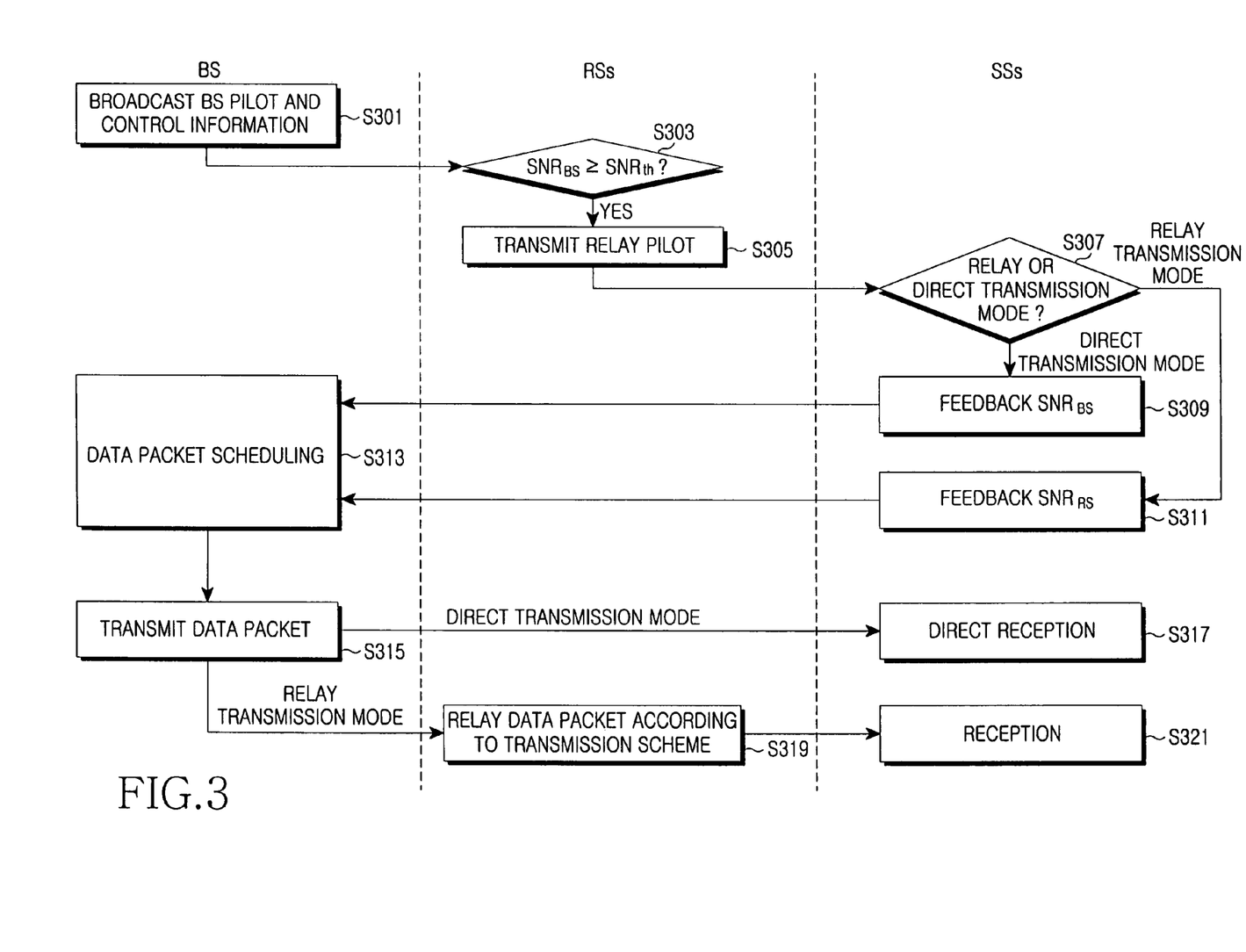
FIG. 3 is a flowchart illustrating a relay transmission procedure according to the present invention.

FIG. 3 is a flowchart illustrating a relay transmission method according to the present invention.

First, a BS broadcasts a BS pilot symbol and control information by using the packet 10 including a BS pilot symbol and control information shown in FIG. 2. In this case, the BS adds downlink channel allocation information and ID information of an RS, which will be "On" and used for relay transmission in the next frame, to the control information, and transmits the packet 10 including the control information (step 301). Herein, the BS may designate either an RS located closer to the BS, or an RS that receives the intensity of a pilot symbol exceeding a threshold value from the BS, as an RS to be "On" in the next frame. RSs and SSs, which have received a BS pilot symbol, measure an $SNR_{BS}$, which is an SNR from the BS.

Then, each RS determines whether the measured $SNR_{BS}$ is equal to or greater than a threshold value "$SNR_{TH}$" (step 303). When an RS determines that the measured $SNR_{BS}$ is equal to or greater than the $SNR_{TH}$, and is appointed as an RS to be "On" in the next frame by the BS, the RS transmits a relay pilot symbol to SSs by using the relay pilot packet 20 shown in FIG. 2 (step 305). Then, each RS, which has transmitted a relay pilot symbol to SSs, so notifies the BS through the uplink control packet 50 shown in FIG. 2 by using its own ID information. Each SS, which has received the relay pilot symbol, measures an $SNR_{RS}$ which is an SNR from the relevant RS.

Meanwhile, each SS determines whether the SS will receive data packets through a direct transmission mode from the BS or via a relay transmission mode, based on the $SNR_{BS}$ and the $SNR_{RS}$ (step 307).

When the direct transmission mode has been selected, the SS feeds information indicating that the direct transmission mode has been selected and the $SNR_{BS}$, back to the BS through the uplink control packet 50 shown in FIG. 2 (step 309). When the relay transmission mode has been selected, the SS feeds information indicating that the relay transmission mode has been selected and the $SNR_{RS}$, back to the BS through the uplink control packet 50 shown in FIG. 2 (step 311). Herein, information regarding either the direct transmission mode or the relay transmission mode having been selected, for example, may be transmitted to the BS using 1 bit. In this case, the 1 bit may have a value of "1" for the direct transmission mode and a value of "0" for the relay transmission mode.

In step 313, the BS performs a data packet scheduling by using information fed back from the SSs. In step 315, the BS transmits data packets to the SSs either directly or via RSs, according to user request. In this case, the RSs, which have transmitted the relay pilot symbols to the SSs and notified the BS of the transmission information in step 305, are used for the relay transmission.

The SS receives the data packets directly from the BS in step 317 in the case of the direct transmission mode, and the SS receives the data packets via a relevant RS from the BS in step 321 in the case of the relay transmission mode.

As described above, according to the present invention, a BS appoints and reports RSs to be used for relay transmission, and each appointed RS determines whether the RS can perform relay transmission based on its own signal intensity, so that optimum RSs to be used for relay transmission can be selected in just two steps.

Meanwhile, in the case of the relay transmission mode, an RS relays data packets from a BS to an SS based on the transmission scheme of the RS, which include a coherent decode-and-forward (coherent DF) scheme, a select decode-and-forward (select DF) scheme and a non-coherent decode-and-forward (non-coherent DF) scheme.

According to the coherent DF relay scheme, RSs participating in a relay transmission appropriately compensate for power and phase, so that relayed data packets are coherently combined in a relevant SS. According to the select DF relay scheme, each SS selects an optimum RS, and data packets are relayed via only the selected RS. According to the non-coherent DF relay scheme, RSs participating in a relay transmission relay data packets from a BS to an SS without compensating for power and phase, so that relayed data packets are non-coherently combined in a relevant SS.

These relay transmission schemes of an RS are designated by taking signaling overhead and a throughput gain into consideration.

Hereinafter, the relay transmission methods according to the present invention will be described based on each of the aforementioned transmission schemes of an RS.

Figure 4:
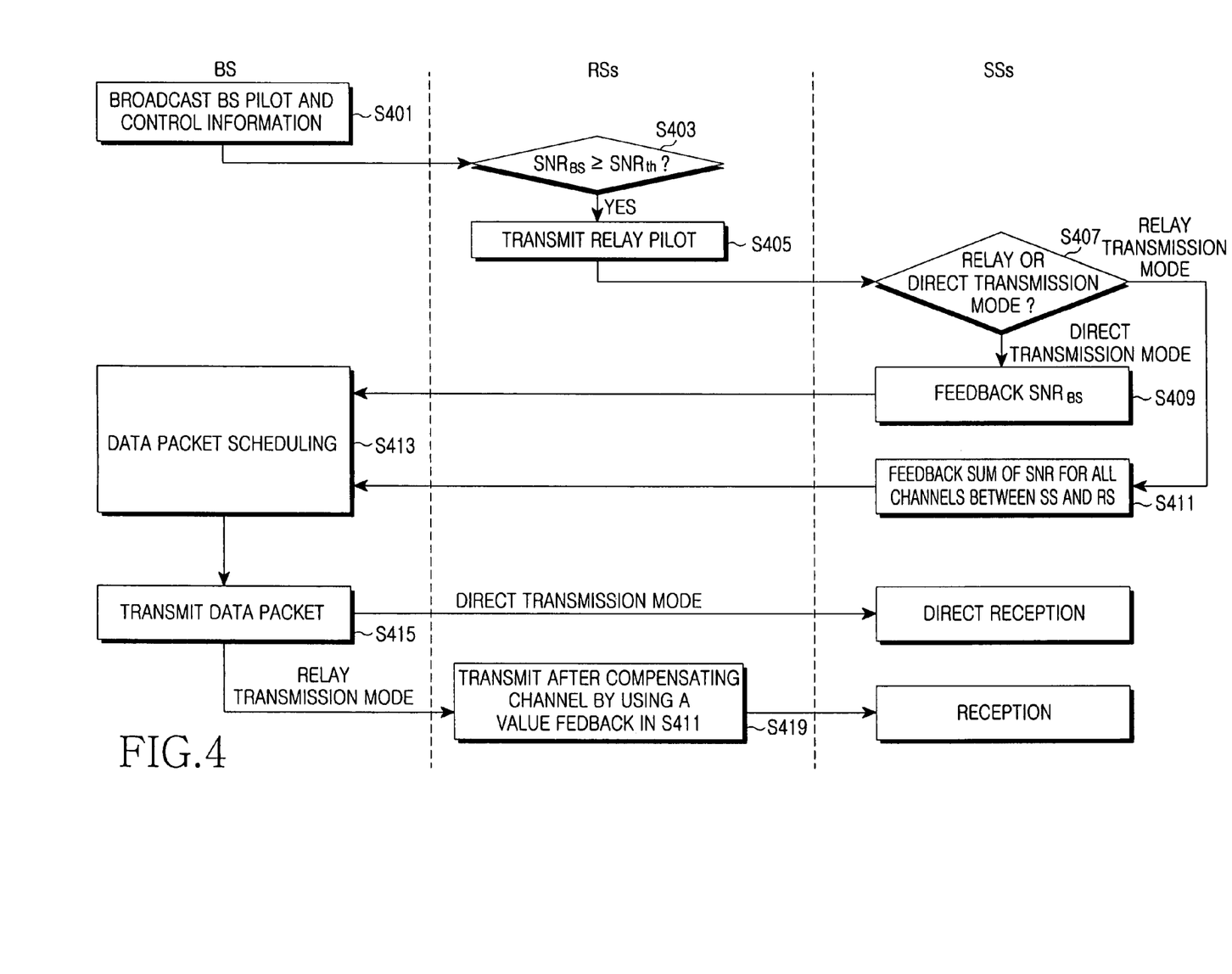
FIG. 4 is a flowchart illustrating a relay transmission procedure according to the present invention.

First, the relay transmission method employing the coherent DF scheme according to a first embodiment of the present invention will be described with reference to FIG. 4.

A BS broadcasts a BS pilot symbol and control information by using the packet 10 including a BS pilot symbol and control information shown in FIG. 2. In this case, the BS adds downlink channel allocation information and ID information of an RS, which will be "On" in the next frame, to the control information, and transmits the packet 10 including the control information (step 401). RSs and SSs, which have received a BS pilot symbol, measure an $SNR_{BS}$, which is an SNR from the BS.

Then, each RS determines whether the measured $SNR_{BS}$ is equal to or greater than a threshold value "$SNR_{TH}$" (step 403). When an RS determines that the measured $SNR_{BS}$ is equal to or greater than the $SNR_{TH}$, and is appointed as an RS to be "On" in the next frame by the BS, the RS transmits a relay pilot symbol to SSs by using the relay pilot packet 20 shown in FIG. 2 (step 405). Then, each RS, which has transmitted a relay pilot symbol to SSs, so notifies the BS through the uplink control packet 50 shown in FIG. 2 by using its own ID information.

Meanwhile, each SS, which has received the relay pilot symbol, measures an $SNR_{RS}$ which is an SNR from the relevant RS. In detail, each SS measures "$h_{RS_k \to SS}$" with respect to all channels i(i=1, . . . , L) between the SS and the RS. Herein, 'k' represents the index of an RS.

Each SS determines whether the SS will receive data packets through the direct transmission mode or the relay transmission mode, based on the $SNR_{BS}$ and the $SNR_{RS}$ (step 407).

When the direct transmission mode has been selected, the SS feeds information indicating that the direct transmission mode has been selected and the $SNR_{BS}$, back to the BS through the uplink control packet 50 shown in FIG. 2 (step 409). When the relay transmission mode has been selected, the SS feeds information indicating that the relay transmission mode has been selected and the sum $$"\sum_{i=1}^{L} |h_{RS_i \to SS}|^2"$$

of SNRs with respect to all channels i(i=1, . . . , L) between the SS and the RS, back to the BS through the uplink control packet 50 shown in FIG. 2 (step 411).

In step 413, the BS performs a data packet scheduling by using information fed back from the SSs.

When a scheduled SS requires a direct transmission mode, the BS transmits data packets directly to the SS (step 415). In contrast, when a scheduled SS requires a relay transmission mode, the BS broadcasts the sum $$"\sum_{i=1}^{L} |h_{RS_i \to SS}|^{2}"$$

of SNRs with respect to all channels i(i=1, ..., L) between the SS and the RS, which has been fed back from the SS in step 411, through the packet 10 having the control information as shown in FIG. 2, while transmitting data packets to the RS (step 415).

Then, each RS divides the complex conjugate of $h_{RS_k \to SS}$ (which has been measured for channels between the SS and the RS by a pilot symbol transmitted for a CQI feedback from the SS) by the sum $$"\sum_{i=1}^{L} |h_{RS_i \to SS}|^{2}"$$

of SNRs with respect to all channels i(i=1, ..., L) between the SS and the RS (which has been broadcasted from the BS), thereby performing channel compensation, and then relays the data packets from the BS to the SS (step 419). This may be expressed as Equation 1.

$$w_{RS_k \to SS} = \frac{h^{*}_{RS_k \to SS}}{\sum_{i=1}^{L} |h_{RS_i \to SS}|^{2}} \quad (1)$$

Herein, "$h^{*}_{RS_k \to SS}$" represents the complex conjugate of $h_{RS_k \to SS}$ with respect to a channel between the SS and the RS, 'k' represents the index of an RS and "i" represents an index for channels between the SS and the RS. The RS multiplies the $w_{RS_k \to SS}$ calculated by Equation 1 by a signal to be relayed, thereby performing channel compensation, and transmits data to the SS. In this case, the RSs, which have transmitted the relay pilot symbols to the SSs and notified the BS of the transmission information in step 405, are used for the relay transmission. Then, the SS adds all the data packets received from the RSs, thereby using all data packets.

Figure 5:
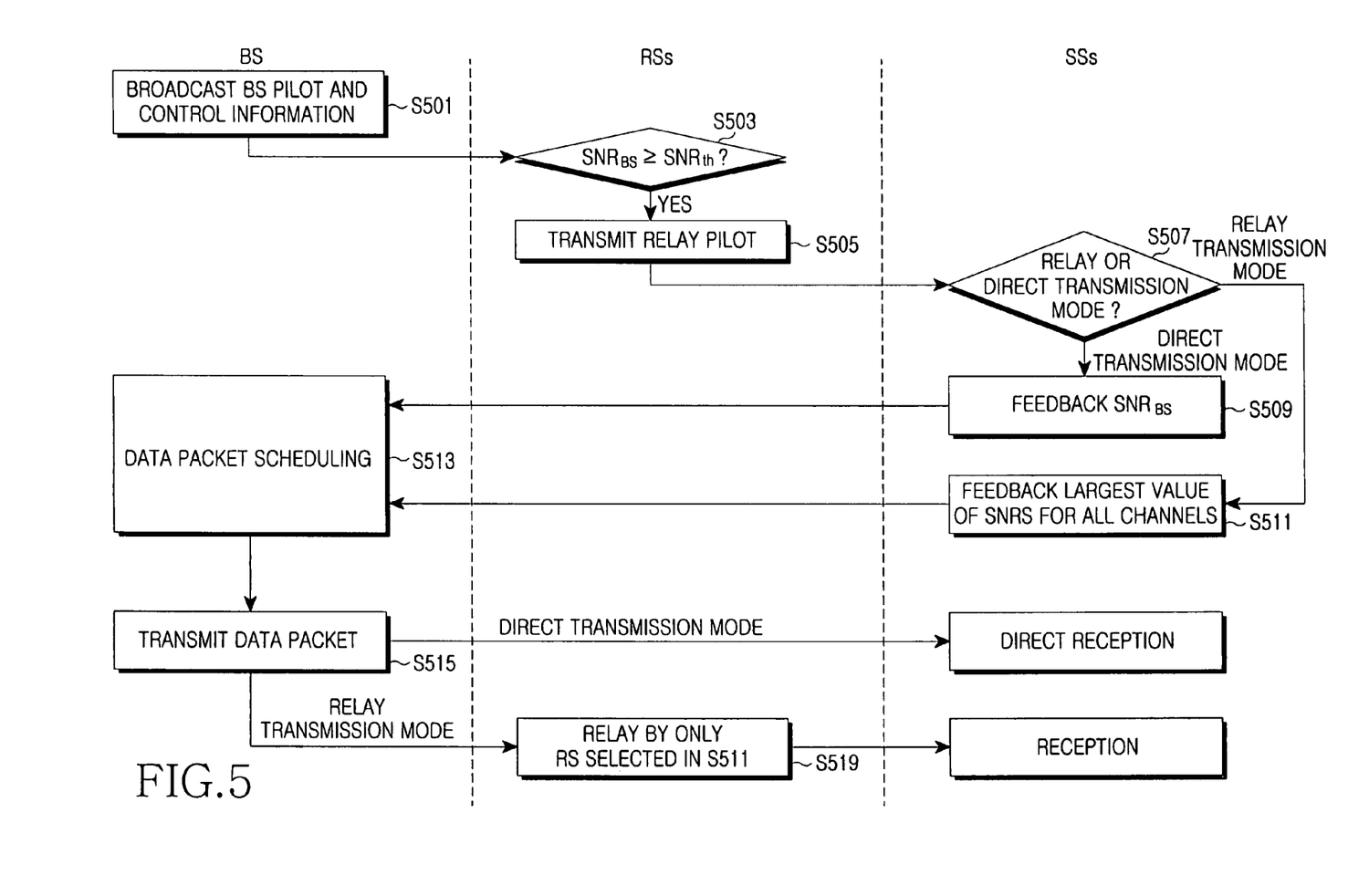
FIG. 5 is a flowchart illustrating a relay transmission procedure according to the present invention.

Next, the relay transmission method employing the select DF scheme according to a second embodiment of the present invention will be described with reference to FIG. 5.

A BS broadcasts a BS pilot symbol and control information by using the packet 10 including a BS pilot symbol and control information shown in FIG. 2. In this case, the BS adds downlink channel allocation information and ID information of an RS, which will be "On" in the next frame, to the control information, and transmits the packet 10 including the control information (step 501). RSs and SSs, which have received a BS pilot symbol, measure an $SNR_{BS}$, which is an SNR from the BS.

Then, each RS determines whether the measured $SNR_{BS}$ is equal to or greater than a threshold value "$SNR_{TH}$" (step 503). When an RS determines that the measured $SNR_{BS}$ is equal to or greater than the $SNR_{TH}$, and is appointed as an RS to be "On" in the next frame by the BS, the RS transmits a relay pilot symbol to SSs by using the relay pilot packet 20 shown in FIG. 2 (step 505). Then, each RS, which has transmitted a relay pilot symbol to SSs, so notifies the BS through the uplink control packet 50 shown in FIG. 2 by using its own ID information.

Meanwhile, each SS, which has received the relay pilot symbol, measures an $SNR_{RS}$ which is an SNR from the relevant RS. In detail, each SS measures "$h_{RS_k \to SS}$" with respect to all channels i(i=1, ..., L) between the SS and the RS. Herein, 'k' represents the index of an RS.

Meanwhile, each SS determines whether the SS will receive data packets through the direct transmission mode or the relay transmission mode, based on the $SNR_{BS}$ and the $SNR_{RS}$ (step 507).

When the direct transmission mode has been selected, the SS feeds information indicating that the direct transmission mode has been selected and the $SNR_{BS}$, back to the BS through the uplink control packet 50 shown in FIG. 2 (step 509). When the relay transmission mode has been selected, the SS feeds information indicating that the relay transmission mode has been selected, the largest value of SNRs for all channels between the SS and the RS, and the index of an RS which forms a channel having the largest SNR value, back to the BS through the uplink control packet 50 shown in FIG. 2 (step 511). That is, when the relay transmission mode has been selected, the SS selects an optimum RS, and feeds back information about the selected RS to the BS so as to receive data packets via the selected RS.

In step 513, the BS performs a data packet scheduling by using information fed back from the SSs.

When a scheduled SS requires a direct transmission mode, the BS transmits data packets directly to the SS (step 515). In contrast, when a scheduled SS requires a relay transmission mode, the BS broadcasts the index of the optimum RS fed back from the SS in step 511, through the packet 10 having the control information as shown in FIG. 2, while transmitting data packets to the RS (step 515). Then, only the optimum RS appointed by the BS decodes and forwards the data packet transmitted from the BS, thereby relaying the data packets to the SS (step 519).

Figure 6:
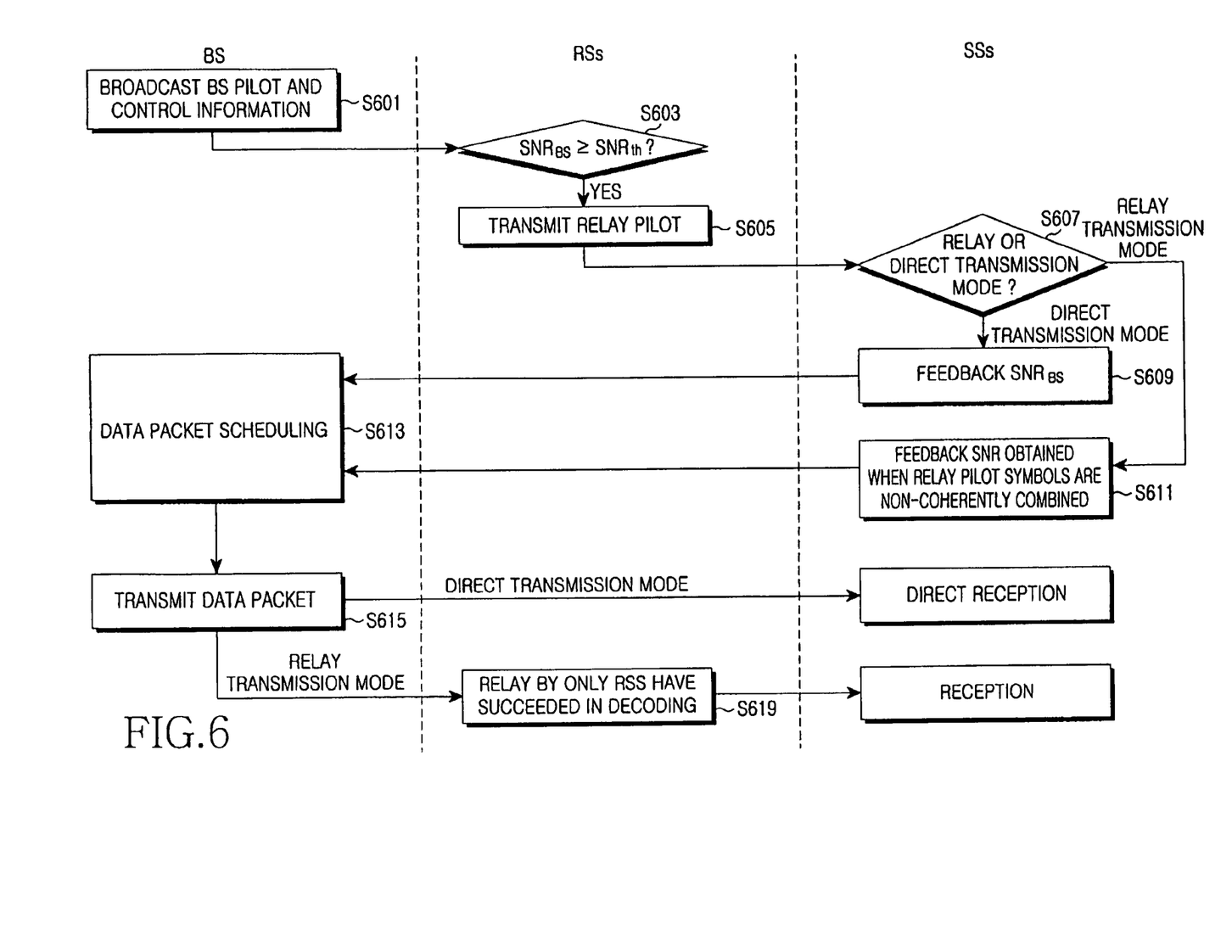
FIG. 6 is a flowchart illustrating a relay transmission procedure according to the present invention.

Finally, the relay transmission method employing the non-coherent DF scheme according to a third embodiment of the present invention will be described with reference to FIG. 6.

A BS broadcasts a BS pilot symbol and control information by using the packet 10 including a BS pilot symbol and control information shown in FIG. 2. In this case, the BS adds downlink channel allocation information and ID information of an RS, which will be "On" in the next frame, to the control information, and transmits the packet 10 including the control information (step 601). RSs and SSs, which have received a BS pilot symbol, measure an $SNR_{BS}$, which is an SNR from the BS.

Then, each RS determines if the measured $SNR_{BS}$ is equal to or greater than a threshold value "$SNR_{TH}$" (step 603). When an RS determines that the measured $SNR_{BS}$ is equal to or greater than the $SNR_{TH}$, and is appointed as an RS to be "On" in the next frame by the BS, the RS transmits a relay pilot symbol to SSs by using the relay pilot packet 20 shown in FIG. 2 (step 605). Then, each RS, which has transmitted a relay pilot symbol to SSs, so notifies the BS through the uplink control packet 50 shown in FIG. 2 by using its own ID information.

Each SS, which has received relay pilot symbols from a plurality of RSs, measures an SNR obtained when the received relay pilot symbols are non-coherently combined.

Meanwhile, each SS determines whether the SS will receive data packets through the direct transmission mode or the relay transmission mode, based on the $SNR_{BS}$ and the SNR obtained when the relay pilot symbols are non-coherently combined (step 607).

When the direct transmission mode has been selected, the SS feeds information indicating that the direct transmission mode has been selected and the $SNR_{BS}$, back to the BS through the uplink control packet 50 shown in FIG. 2 (step 609). When the relay transmission mode has been selected, the SS feeds information indicating that the relay transmission mode has been selected, and the SNR obtained when the relay pilot symbols are non-coherently combined, back to the BS through the uplink control packet 50 shown in FIG. 2 (step 611).

In step 613, the BS performs a data packet scheduling by using information fed back from the SSs.

When a scheduled SS requires a direct transmission mode, the BS transmits data packets directly to the SS. In contrast, when a scheduled SS requires a relay transmission mode, the BS transmits the data packets to the RSs (step 615). In this case, the RSs, which have transmitted relay pilot symbols to the SSs and notified the BS of the transmission information in step 605, are used for the relay transmission.

Then, only the RSs which have succeeded in decoding, forward the data packets to the SS (step 619).

As described above, according to the present invention, when a BS first appoints and reports RSs to be used for relay transmission, each appointed RS determines whether the RS can perform relay transmission based on its own signal intensity, thereby selecting optimum RSs to be used for relay transmission, so that a separate algorithm for selecting an optimum RS is unnecessary.

Also, the present invention has an effect of reducing the amount of signaling overhead required to transmit data through an RS.

In addition, according to the present invention, although two or more RSs relay a data packet at the same time, the same information is transmitted, so that interference does not occur.

The method according to the present invention may be applied to systems based on TDD and/or HDT(High-bit-rate-Digital Tranceiver).

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for relaying a data packet in a downlink of a wireless communication system, in which a base station (BS) transmits the data packet to subscriber stations (SSs) by using relay stations (RSs), the method comprising the steps of:

broadcasting, by the BS, a BS pilot symbol, which includes information about an RS to be used for relay transmission in a next frame;

receiving, by each RS appointed to be used for relay transmission in the next frame, the BS pilot symbol, measuring a first signal-to-noise ratio (SNR) information which is SNR information between the RS and the BS, transmitting a relay pilot symbol to the SSs when the first SNR information is equal to or greater than a threshold value, and notifying the BS that the RS has transmitted the relay pilot symbol to the SSs;

receiving, by each SS, the BS pilot symbol, measuring a second SNR information which is SNR information between the SS and the BS, receiving the relay pilot symbol, measuring a third SNR information which is an SNR information between the SS and each RS having transmitted the relay pilot symbol, and determining whether the data packet is received via the RS, based on the second and third SNR information;

feeding the third SNR information from each SS back to the BS, when the SS determines that the data packet is received via the RS;

performing, by the BS, a data packet scheduling based on the third SNR information fed back from the SSs, and transmitting the data packet to RSs which have transmitted the relay pilot symbol; and relaying, by the RSs having transmitted the relay pilot symbol, the data packet transmitted from the BS to the SSs.

2. The method as claimed in claim 1, wherein, when the RSs employ a coherent decode-and-forward (coherent DF) scheme, each of the SSs feeds a sum of SNRs for all channels between the SS and RSs, which have transmitted the relay pilot symbol, as the third SNR information back to the BS; and the RSs, which have transmitted the relay pilot symbol, receive the third SNR information from the BS, compensate a channel, and relay the data packet to the SSs.

3. The method as claimed in claim 1, wherein, when the RSs employ a select decode-and-forward (select DF) scheme, each of the SSs feeds a largest value of SNRs for all channels between the SS and RSs, which have transmitted the relay pilot symbol, as the third SNR information back to the BS; and an RS, which corresponds to the largest SNR value, out of the RSs having transmitted the relay pilot symbol, relays the data packet to the SSs.

4. The method as claimed in claim 1, wherein, when the RSs employ a non-coherent decode-and-forward (non-coherent DF) scheme, each of the SSs feeds an SNR value, which is obtained when relay pilot symbols received from the RSs are non-coherently combined, as the third SNR information back to the BS; and an RS, which succeeds in decoding of the data packet transmitted from the BS, relays the data packet to the SSs.

5. The method as claimed in claim 2, further comprising the steps of:

feeding, by the SSs, the second SNR information back to the BS, when the SSs determine that the data packet is received directly from the BS; and performing, by the BS, a data packet scheduling based on the second SNR information fed back from the SSs, and transmitting the data packet directly to the SSs.

6. A method for relaying a data packet in a downlink of a wireless communication system, in which a base station (BS) transmits the data packet to subscriber stations (SSs) by using relay stations (RSs), the method comprising the steps of:

broadcasting, by the BS, a BS pilot symbol, which includes information about an RS to be used for relay transmission in a next frame;

receiving, by each RS appointed to be used for relay transmission in the next frame, the BS pilot symbol, measuring a first signal-to-noise ratio (SNR) information which is SNR information between the RS and the BS, transmitting a relay pilot symbol to the SSs when the first SNR information is equal to or greater than a threshold value, and notifying the BS that the RS has transmitted the relay pilot symbol to the SSs;

receiving, by each SS, the BS pilot symbol, measuring a second SNR information which is SNR information between the SS and the BS, receiving the relay pilot symbol, measuring a third SNR information which is a sum of SNR information for all channels between the SS and RSs having transmitted the relay pilot symbol, and determining whether the data packet is received via the RS, based on the second and third SNR information;

feeding the third SNR information from each SS back to the BS, when the SS determines that the data packet is received via the RS;

performing, by the BS, a data packet scheduling based on the third SNR information fed back from the SSs, and transmitting the data packet to RSs which have transmitted the relay pilot symbol; and receiving, by the RSs having transmitted the relay pilot symbol, the third SNR information from the BS, compensating a channel, and relaying the data packet transmitted from the BS to the SSs.

7. The method as claimed in claim 6, further comprising:

feeding, by the SSs, the second SNR information back to the BS, when the SSs determine that the data packet is received directly from the BS; and performing, by the BS, a data packet scheduling based on the second SNR information fed back from the SSs, and transmitting the data packet directly to the SSs.

8. A method for relaying a data packet in a downlink of a wireless communication system, in which a base station (BS) transmits the data packet to subscriber stations (SSs) by using relay stations (RSs), the method comprising the steps of:

broadcasting, by the BS, a BS pilot symbol, which includes information about an RS to be used for relay transmission in a next frame;

receiving, by each RS appointed to be used for relay transmission in the next frame, the BS pilot symbol, measuring a first signal-to-noise ratio (SNR) information which is SNR information between the RS and the BS, transmitting a relay pilot symbol to the SSs when the first SNR information is equal to or greater than a threshold value, and notifying the BS that the RS has transmitted the relay pilot symbol to the SSs;

receiving, by each SS, the BS pilot symbol, measuring a second SNR information which is SNR information between the SS and the BS, receiving the relay pilot symbol, measuring a third SNR information which corresponds to a largest value out of all SNRs for all channels between the SS and RSs having transmitted the relay pilot symbol, and determining whether the data packet is received via the RS, based on the second and third SNR information;

feeding the third SNR information from each SS back to the BS, when the SS determines that the data packet is received via the RS;

performing, by the BS, a data packet scheduling based on the third SNR information fed back from the SSs, and transmitting the data packet to RSs which have transmitted the relay pilot symbol; and relaying, by an RS corresponding to the largest SNR value, the data packet transmitted from the BS to the SSs.

9. The method as claimed in claim 8, further comprising:

feeding, by the SSs, the second SNR information back to the BS, when the SSs determine that the data packet is received directly from the BS; and performing, by the BS, a data packet scheduling based on the second SNR information fed back from the SSs, and transmitting the data packet directly to the SSs.

10. A method for relaying a data packet in a downlink of a wireless communication system, in which a base station (BS) transmits the data packet to subscriber stations (SSs) by using relay stations (RSs), the method comprising the steps of:

broadcasting, by the BS, a BS pilot symbol, which includes information about an RS to be used for relay transmission in a next frame;

receiving, by each RS appointed to be used for relay transmission in the next frame, the BS pilot symbol, measuring a first signal-to-noise ratio (SNR) information which is SNR information between the RS and the BS, transmitting a relay pilot symbol to the SSs when the first SNR information is equal to or greater than a threshold value, and notifying the BS that the RS has transmitted the relay pilot symbol to the SSs;

receiving, by each SS, the BS pilot symbol, measuring a second SNR information which is SNR information between the SS and the BS, measuring a third SNR information which corresponds to an SNR value obtained when relay pilot symbols received from the RSs are non-coherently combined, and determining whether the data packet is received via the RS, based on the second and third SNR information;

feeding the third SNR information from each SS back to the BS, when the SS determines that the data packet is received via the RS;

performing, by the BS, a data packet scheduling based on the third SNR information fed back from the SSs, and transmitting the data packet to RSs which have transmitted the relay pilot symbol; and relaying, by an RS having succeeded in decoding of the data packet transmitted from the BS, the data packet transmitted from the BS to the SSs.

11. The method as claimed in claim 10, further comprising:

feeding, by the SSs, the second SNR information back to the BS, when the SSs determine that the data packet is received directly from the BS; and performing, by the BS, a data packet scheduling based on the second SNR information fed back from the SSs, and transmitting the data packet directly to the SSs.

* * * * *